358-86. OR 2,906,815 SR

SEARCH ROOM

Sept. 29, 1959 E. J. GARGINI 2,906,815

TELEVISION RELAY AND LIKE APPARATUS

Filed Dec. 17, 1952 2 Sheets-Sheet 1

Inventor
ERIC JOHN GARGINI
By Ralph E. Atherton
Attorney

TELEVISION RELAY AND LIKE APPARATUS

Filed Dec. 17, 1952 2 Sheets-Sheet 2

Inventor
ERIC JOHN GARGINI
By Ralph E. Atherton
Attorney

United States Patent Office 2,906,815 Patented Sept. 29, 1959

2,906,815

TELEVISION RELAY AND LIKE APPARATUS

Eric John Gargini, Yiewsley, West Drayton, England, assignor to Electric & Musical Industries Limited, Hayes, Middlesex, England, a company of Great Britain Application December 17, 1952, Serial No. 326,527

Claims priority, application Great Britain December 20, 1951

7 Claims. (Cl. 178—6)

Figure 1:
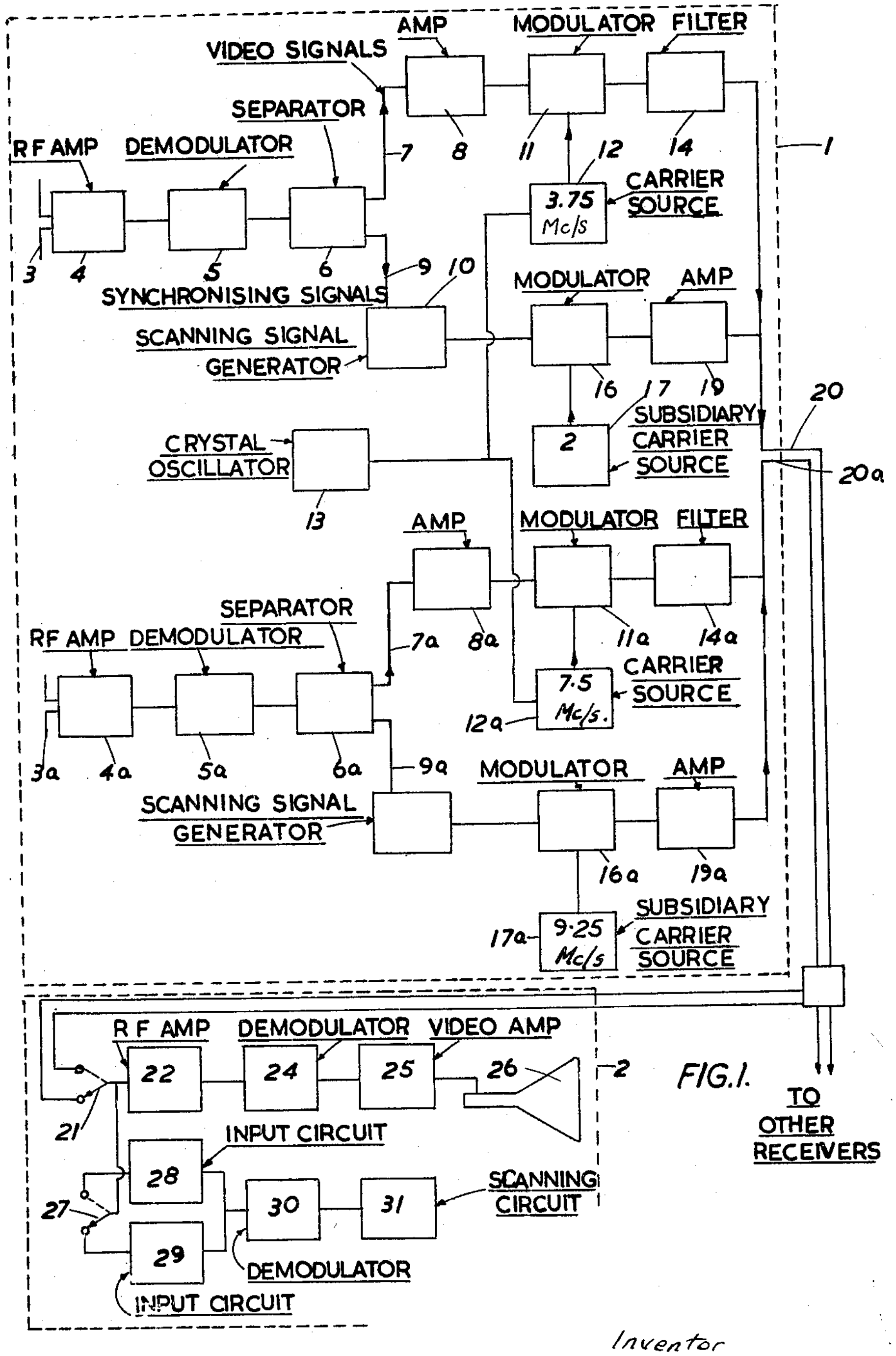

This invention relates to television relay apparatus.

It has been proposed heretofore to provide television relay apparatus comprising a distributing unit for receiving broadcast television programmes, amplifying them, and then distributing them by cable to a plurality of terminal receivers. One such proposal is described in the specification of United States patent application Serial No. 232,577, now Patent No. 2,836,649, issued May 27, 1958, and in the apparatus described therein, the video signals of the broadcast programmes are distributed on one carrier wave and scanning information is distributed on another carrier wave. In localities where alternative broadcast television programmes are available, it is of course desirable to distribute the alternative programmes simultaneously to the receivers so that a subscriber may choose the programme which he desires to receive. However, this gives rise to difficulties since it is desirable, on considerations of cost and maintenance, that the receiver units should be as simple and inexpensive as possible and the provision of selective filters for separating the alternative programmes is, on that account, undesirable. Moreover, practical considerations will usually require juxtaposition of the cable channels carrying the alternative programmes with consequent risk of cross talk from one channel to the other. This cannot be eliminated by filtering and is liable to produce a second or "ghost" picture superimposed on the picture of the selected programme at the terminal units.

The object of the present invention is to reduce the difficulties aforesaid, which arise where it is desired to distribute different sets of television signals by different but nevertheless adjacent cable channels.

According to the present invention there is provided television relay apparatus comprising means for deriving a first carrier wave modulated with signals of one television programme, means for deriving a second carrier wave modulated with signals of another programme, said carrier waves having frequencies predetermined to cause the upper sideband components produced by the modulation of one carrier wave to occupy a frequency zone which overlaps substantially the frequency zone occupied by the lower sideband components produced by the modulation of the other carrier wave, at least one receiver having transducing means for said signals, a first cable channel connected to receive said upper sideband components and the corresponding carrier wave, a second cable channel adjacent said first channel and connected to receive the lower sideband components and the corresponding carrier wave, and switch means at the receiver for selectively connecting said channels to said transducing means.

The present invention is especially applicable where the different cable channels are enclosed in a single cable, for example a cable having four symmetrically disposed conductors enclosed for collective screening by a copper sheath. In this case one channel is preferably formed by two opposite conductors and the other channel by the remaining two conductors, so that substantial channel isolation is obtained.

It will be appreciated that, in accordance with the present invention, programme selection at a receiving unit is merely a matter of switching the cable channel distributing the desired programme to the input circuit of the receiver. The two carrier waves in the different cable channels have necessarily a frequency separation at least equal to the overlap of the frequency zones occupied by the respective upper and lower sideband components. When cross-talk occurs, the interfering signals in any one channel which are likely to have greatest energy are those of the carrier frequency for the other channel. As interference signals in the other channel they appear, after demodulation, as components of relatively high frequency and as such are less disturbing than would be the case if they appeared as low frequency components. The advantage of this frequency "inversion" is particularly marked when the desired signals are video signals, for low frequency signals can produce a very obvious interference pattern on a reproduced picture whereas high frequency interfering signals may be relatively unnoticeable. Moreover, when the signals in both cable channels are video signals, such cross-talk as inevitably occurs between the cable channels does not give rise to a disconcerting second picture when either set of video signals is reproduced. The frequency "inversion" of signals picked up by either cable channel from the other causes frequencies representing coarse structure of the picture transmitted in the channel from which the pickup occurs to be converted to fine structure in the other. Picked up signals are thus "scrambled" and are of course relatively weak compared with the desired signals, so that such interference as they produce in the picture after demodulation with the desired signals has no intelligence content and is relatively innocuous.

According to a preferred feature of the invention the frequency of one of said carrier waves is double that of the other carrier wave. By interlocking the two carrier frequencies in this way, the liability for low frequency patterns to appear on the screen due to hetrodyning between the higher carrier frequency and the second harmonic of the lower carrier frequency is substantially eliminated.

The line frequencies appertaining to the video signals in the different channels need bear no relation to each other nor to either carrier frequency.

Figure 2:
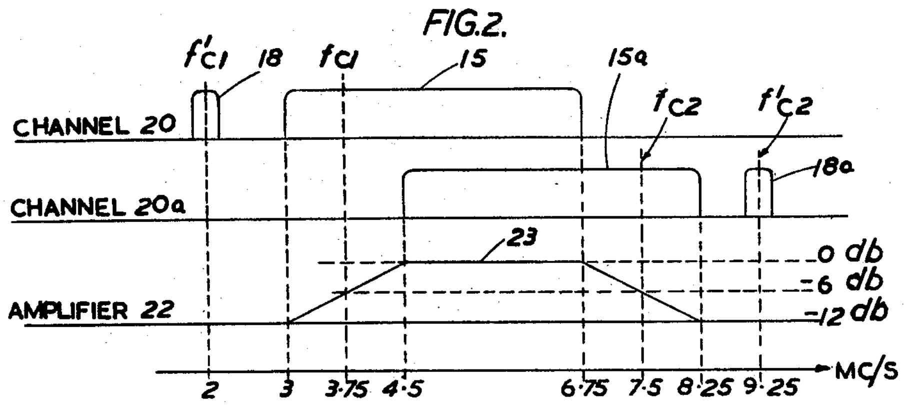
Figure 3:
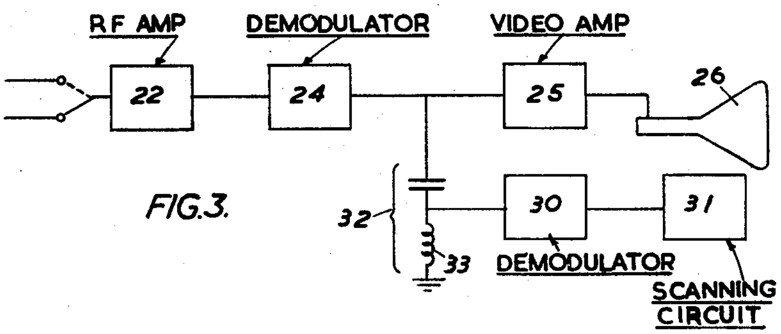
Figure 4:
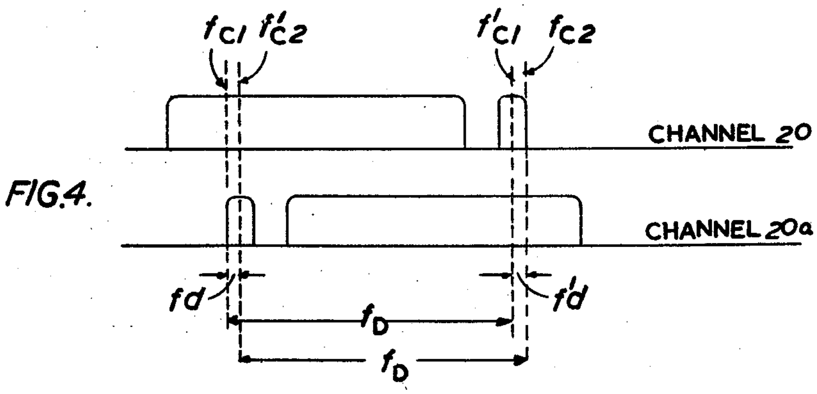

In order that the said invention may be clearly understood and readily carried into effect, the same will now be more fully described with reference to the accompanying drawings, in which:

Figure 1 illustrates diagrammatically and in block form one example of the present invention applied to television relay apparatus, Figure 2 comprises response characteristics explanatory of the operation of Figure 1, Figure 3 illustrates a modification of parts of Figure 1, and Figure 4 comprises response characteristics explanatory of Figure 3.

Referring to the drawings, the apparatus illustrated in Figure 1 comprises a distributing unit which is shown enclosed by the dotted rectangle 1 and a plurality of receivers, one of which is shown within the dotted rectangle 2. The distributing unit comprises two sections for distributing different broadcast television waveforms. The two sections are similar and consequently only one of the sections will be described in detail. This section comprises an antenna 3 for picking up one of the broadcast television waveforms and feeding the waveform to a radio frequency amplifier 4, the television waveform being, as will be understood, broadcast on a carrier wave. A demodulator 5 is arranged to demodulate the output of the radio frequency amplifier 4, and the output of the demodulator will be assumed to comprise video signals interspersed with synchronising signals in well known manner. The output of the demodulator is then fed to a separator circuit 6 which has a first output comprising video signals from which the synchronising signals have been removed, this output being fed by conductor 7 to a video frequency amplifier 8. The separator circuit 6 has a further output comprising synchronising signals from which the video signals have been removed and this output is fed by a conductor 9 to a scanning signal generator 10 which will be referred to subsequently. The video signal output from the amplifier 8 is fed to a modulator 11 and there caused to modulate a carrier wave received from a carrier wave generator 12, the frequency of this generator being locked to 3.75 megacycles per second (mc./s.) by a crystal controlled oscillator 13. The modulated carrier wave output from the modulator 11 is then applied to a filter 14 which is arranged to have a response as represented by the graph 15 in Figure 2 of the drawing. Thus, the filter has a passband from about 3 to 6.75 mc./s. so that it suppresses most of the lower sideband of the output from the modulator 11 but passes the carrier frequency, denoted by $f_{c1}$ in the drawing, and the upper sideband.

The scanning signal generator 10 aforesaid is arranged to generate scanning signals for controlling the scanning of the image reproducing tubes in the receivers of the relay apparatus the scanning signals being synchronised by the synchronising signals received via the conductor 9. The generator may for example be of the form described with reference to Figure 3 in the specification of United States patent application Serial No. 232,577. The output of the scanning signal generator 10 is fed to a second modulator 16 where it is caused to modulate a subsidiary carrier wave having a frequency of 2 mc./s. and received from a carrier wave generator 17. The output of the modulator 16, which may have a frequency spectrum as represented by the graph 18 in Figure 2 is thereupon amplified in an amplifier 19, the subsidiary carrier frequency being denoted as $f'_{c1}$ in Figure 2. The output of the amplifier 19 is added to the output of the filter 14 and the combined signals are fed to the receivers by means of one channel 20 of a cable.

As aforesaid, the other section of the distributing unit is similar to the section already described and corresponding parts are denoted by the same reference numerals but with the addition of suffix *a* The video signal carrier wave generator **12*a* has a frequency of 7.5 mc./s. and it is also locked to the crystal oscillator 13 so that the frequency relation between the generators 12 and 12*a* is accurately maintained. The frequency of the generator 12*a* is in fact the second harmonic frequency of the generator 12 so that any liability for a low frequency pattern to be produced by heterodyning between the oscillations of the two generators is substantially reduced. The foregoing difference between the two carrier waves is greater than the maximum modulation frequency of either carrier wave. Moreover, the passband of the filter 14*a* as shown by graph 15*a* (Figure 2) extends from 4.5 to 8.25 mc./s., the video signal carrier frequency being denoted as $f_{c2}$. Therefore it is the lower sideband of the carrier wave $f_{2c}$, modulated with video signals of waveform picked up by the antenna 3*a* which is derived from the filter 14*a*, most of the upper sideband being suppressed. Moreover as clearly shown in Figure 2 the lower sideband of the output from the filter 14*a* substantially overlaps the upper sideband from the output of the filter 14. The subsidiary carrier wave oscillator 17*a* has a frequency of 9.25 mc./s. and the frequency spectrum of the output of the modulator 16*a* as represented by the graph 18*a*, $f'_{c2}$ denoting the subsidiary carrier frequency. The assumption is made that the line and frame frequencies appertaining to the waveforms picked up respectively by the antennas 3 and 3*a* are not interlocked so that separate scanning signals are required from generators 10 and 10*a*, synchronised by the synchronising signals from the corresponding waveforms. A cable channel 20*a* carries the frequency spectrum represented by the graphs 15*a* and 18*a*** in Figure 2.

The receiver 2 comprises a manual switch 21 which leads to a radio frequency amplifier 22, the manual switch being operable to connect the input circuit of the amplifier selectively to the channel 20 and to the channel **20*a*. As shown in the drawing the input circuit is connected to the channel 20. The radio frequency amplifier 22 has a response characteristic represented by the graph 23 in Figure 2. The response is uniform and maximum between the frequencies 4.5 and 7.5 mc./s., and declines above and below these frequencies so that at $f_{c1}$ and $f_{c2}$ it is 6 db down and at 3 and 8.25 mc./s. respectively is 12 db down. The amplifier can therefore respond adequately to the video signal carrier wave and such modulation components thereof as are present in either channel 20 and 20*a*. The output of the radio frequency amplifier 22 is fed to a demodulator 24 which demodulates whichever video-signal carrier wave is being received and produces an output of the corresponding video signals. This output is then fed via video frequency amplifier 25 to the modulator electrode of a cathode ray image reproducing tube 26**.

The radio frequency amplifier 22 is not responsive to the subsidiary carrier waves $f'_{c1}$ and $f'_{c2}$ modulated with the scanning signals. However the switch 21 is connected to a further switch 27 so that all signals received via the switch 21 can be selectively applied to two input circuits 28 and 29 in the scanning circuit of the receiver. The input circuit 28 is responsive only over the frequency spectrum of the graph 18 whilst the circuit 29 is responsive only over the frequency spectrum of the graph **18*a*. The connection between the switches 21 and 27 is such that when signals are received from the channel 20, 27 is switched to the circuit 28, and when signals are received from the channel 20*a*, 27 is switched to the circuit 29. The input circuits 28 and 29 lead to a demodulator 30 which demodulates whichever one of the subsidiary carrier waves is being received, the output of the demodulor being fed to a scanning circuit 31 which is responsive to the scanning signals to produce scanning deflections in the cathode ray tube 26. The scanning circuit 31** may for example be of the construction described in the aforesaid co-pending patent application.

It will be appreciated that with the apparatus described a subscriber at a receiver need only operate the connected switches 21 and 27 to condition the receiver for the reception of either of the broadcast programmes distributed by the distributing unit. Moreover any disturbance caused in the reproduced picture due to cross talk between the cable channels 20 and **20*a*** is rendered substantially innocuous, for the reasons previously described.

Modifications may be made in the apparatus described. For instance if the line and frame frequencies appertaining to the waveforms picked up by the antennas 3 and **3*a* are locked to a common mains supply frequency, only one subsidiary carrier wave modulated with scanning signals need be produced at the distributing unit. Each receiver 2 may then be modified by the elimination of one of the scanning input circuits 28 and 29, in which case the remaining input circuit will be permanently connected to the cable channel which carries the single subsidiary carrier wave. In this case, however, there may be different time delays from the different broadcast transmitters to the distributing unit 1, resulting in phase differences between the line periods in the waveform picked up by the antenna 3 and that picked up by the antenna 3*a*. This phase difference may be compensated at the distributing unit by a delay filter for delaying one of the received waveforms by the appropriate amount or alternatively by providing a delay filter at each receiver which is switched selectively into and out of the circuit as required on operation of the switch 21**. Where a separate subsidiary carrier wave modulated with scanning signals is produced for each channel, the modulated subsidiary carrier wave can be caused to modulate the video signal carrier wave in the manner described in the specification of British patent application No. 29816/51.

Alternatively, as illustrated in Figure 4, the subsidiary carrier wave $f'_{c1}$ and $f'_{c2}$ can be located between the video signal carrier wave $f_{c1}$ and $f_{c2}$. In this case, the frequency difference between $f'_{c1}$ and $f_{c1}$ is arranged to be the same as the frequency difference between $f'_{c2}$ and $f_{c2}$. This difference is denoted in Figure 4 by $f_D$ and it exceeds the maximum modulation frequency of either of the carrier waves $f_{c1}$ and $f_{c2}$. Moreover, the frequency difference between $f'_{c2}$ and $f_{c1}$, denoted in the drawing by $f_d$ is arranged to be at least approximately an odd multiple of half the line frequency appertaining to the video signal modulation on the carrier wave $f_{c1}$. It will be apparent from Figure 4 that the frequency spectrum of the modulated subsidiary carrier wave $f'_{c2}$ falls within the upper sideband of the video signal carrier wave $f'_{c1}$. Therefore when the receiver 2 is conditioned to receive the carrier wave $f_{c1}$, the subsidiary carrier wave $f_{c2}$ in the other channel would be liable to produce interference on the pictures reproduced by the tube 26. However, with the selected frequency difference $f_d$, this interference is rendered substantially self-destructive, for the reason explained in the specification of British patent application No. 29,816/51 and as also explained in this specification $f_d$ is preferably arranged to be an odd multiple of half the line frequency appertaining to the video signals modulated on the carrier wave $f_{c1}$ plus or minus half the field frequency (assuming interlaced scanning). For similar reasons the frequency difference $f'_d$ between $f'_{c1}$ and the video signal carrier wave $f_{c2}$ is arranged to be at least approximately an odd multiple of half the line frequency appertaining to the video signals modulated on the carrier wave $f_{c2}$.

When the distributing unit is modified as described with reference to Figure 4 it will be appreciated that both the subsidiary carrier waves $f'_{c1}$ and $f'_{c2}$ fall within the response range of the radio frequency amplifier 22 of the receiver 2. Separate input circuits 28 and 29 for the subsidiary carrier waves are therefore unnecessary and the subsidiary carrier wave of the particular channel to which the receiver is connected by the switch 21 can be filtered out, as shown in Figure 3, by means of a sucker circuit 32 in the output circuit of the demodulator 24, tuned to the aforesaid difference frequency $f_D$. This sucker circuit is shown conventionally as a series tuned resonant circuit and an output of the appropriate subsidiary carrier wave is derived from the inductance 33 and fed thence to the demodulator 30 preceding the scanning circuit 31.

What I claim is:

1. Television relay apparatus comprising means for deriving a first carrier wave modulated with signals of one television programme, means for deriving a second carrier wave modulated with signals of another programme, said carrier waves having frequencies predetermined to cause the upper sideband components produced by the modulation of one carrier wave to occupy a frequency zone which overlaps substantially the frequency zone occupied by the lower sideband components produced by the modulation of the other carrier wave, at least one receiver having transducing means for said signals, a first cable channel connected to receive said upper sideband components, a second cable channel adjacent said first channel and connected to receive the lower sideband components, and switch means at the receiver for selectively connecting said channels to said transducing means.

2. Television relay apparatus comprising means for deriving a first carrier wave modulated with signals of one television programme, means for deriving a second carrier wave modulated with signals of another programme, the frequency of one carrier wave being double the frequency of the other carrier wave and said frequencies being predetermined to cause the upper sideband components produced by the modulation of the carrier wave of lower frequency to occupy a frequency zone which overlaps substantially the frequency zone occupied by the lower sideband components produced by the modulation of the carrier wave of higher frequency, at least one receiver having transducing means for said signals, a first cable channel connected to receive said upper side-band components and the corresponding carrier wave, a second cable channel adjacent said first channel and connected to receive said lower sideband components and the corresponding carrier wave, and switch means at the receiver for selectively connecting said channels to said transducing means.

3. Television relay apparatus comprising means for deriving a first carrier wave modulated with signals of one television programme, means for deriving a second carrier wave modulated with signals of another television programme, said carrier waves having frequencies predetermined to cause the upper sideband components produced by the modulation of one carrier wave to occupy a frequency zone which overlaps substantially the frequency zone occupied by the lower sideband components produced by the modulation of the other carrier wave, at least one television receiver having a cathode ray image reproducing tube, and an input channel for said tube having a pass band including said upper and said lower side band components, a first cable channel connected to receive said upper sideband components and the corresponding carrier wave, a second cable channel adjacent said first channel and connected to receive said lower sideband components and the corresponding carrier wave, and switch means at the receiver for selectively connecting said cable channels to said receiver input channel.

4. Television relay apparatus according to claim 3 comprising means for generating scanning signals for the first television programme, means for modulating a subsidiary carrier wave with said scanning signals, and for feeding said modulated subsidiary carrier wave to said first cable channel, means for generating other scanning signals for said second television programme, means for modulating a second subsidiary carrier wave with said other scanning signals and for feeding said second modulated subsidiary carrier wave to said second cable channel, said subsidiary carrier waves having different frequencies, and said receiver having a scanning circuit with separate input circuits sensitive respectively to said modulated subsidiary carrier waves, and switch means for selectively connecting said input circuit to said receiver input channel.

5. Television relay apparatus according to claim 3, said different television programmes having the same scanning frequencies, comprising means for generating scanning signals for both said programmes, means for feeding said scanning signals to one of said cable channels, and a scanning circuit at the receiver connected to said last-mentioned cable channel.

6. Television relay apparatus according to claim 3, comprising means for generating scanning signals for said first television programme, means for modulating a subsidiary carrier wave with said scanning signals, means for modulating said first carrier wave with said subsidiary carrier wave, means for generating other scanning signals for said second television programme, means for modulating a second subsidiary carrier wave with said other scanning signals, means for modulating said second carrier wave with said second modulated subsidiary carrier wave, said subsidiary carrier waves having frequencies predetermined to produce equal frequency differences between the subsidiary carrier waves and the respective carrier waves on which they are modulated, and said receiver including a scanning circuit, and filter means tuned to said frequency difference for feeding scanning signals from the receiver input channel to said scanning circuit.

7. Television relay apparatus according to claim 6 said frequency difference exceeding a maximum frequency of the received programme signals and said subsidiary carrier frequencies being predetermined to produce a frequency difference between the first subsidiary carrier wave and the second carrier wave which is at least approximately an odd multiple of half the line frequency of the signals of the second programme, and to produce a frequency difference between the second subsidiary carrier wave and the first carrier wave which is at least approximately an odd multiple of half the line frequency of the first programme.

References Cited in the file of this patent

UNITED STATES PATENTS

| | | |
|---|---|---|
| 2,035,545 | Green | Mar. 31, 1936 |
| 2,135,577 | Herbst | Nov. 8, 1938 |
| 2,394,917 | Kallmann | Feb. 12, 1946 |
| 2,437,300 | Labin | Mar. 9, 1948 |
| 2,570,475 | Oestreicher | Oct. 9, 1951 |
| 2,628,275 | Parker | Feb. 10, 1953 |